ations.

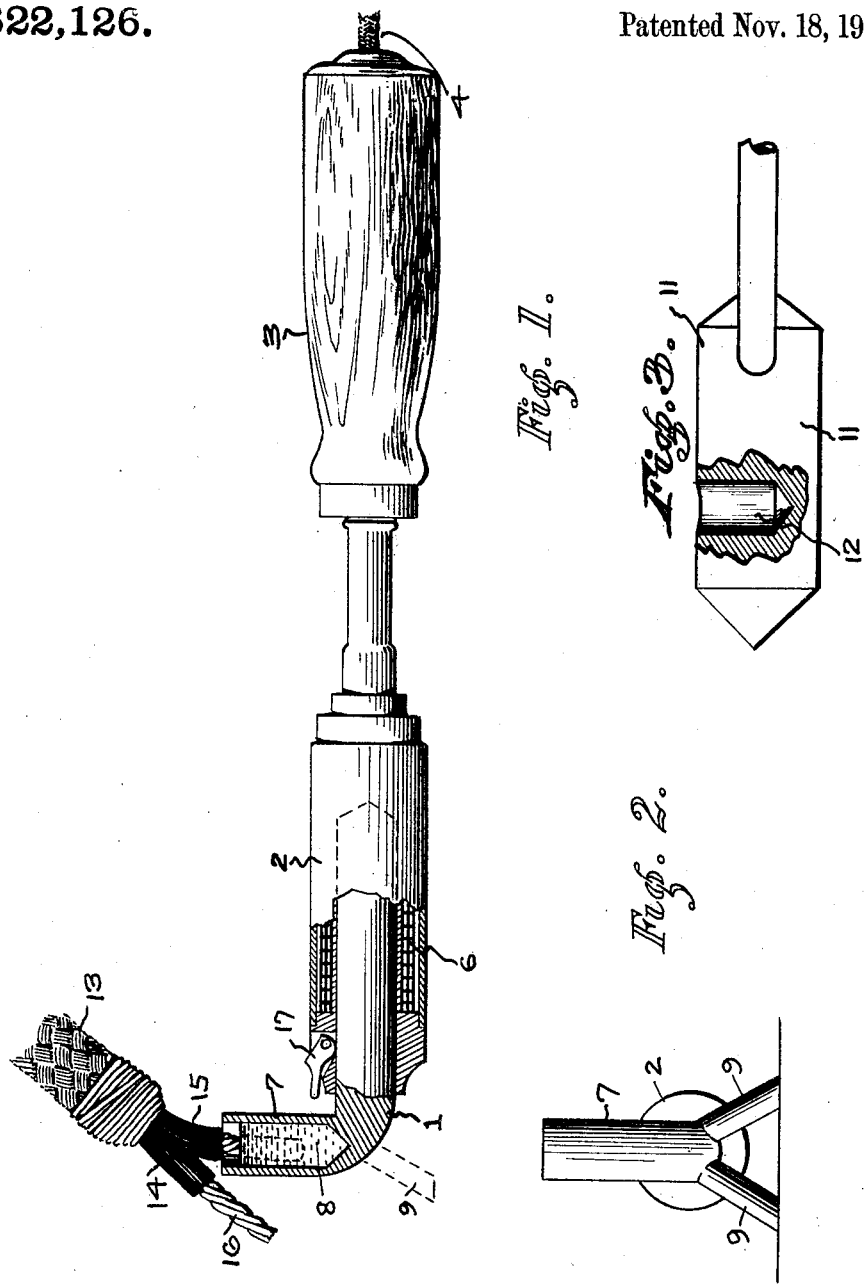

UNITED STATES PATENT OFFICE.

GEORGE T. LUCAS, OF SAN FRANCISCO, CALIFORNIA.

ELECTRIC SOLDERING-IRON.

1,322,126.

Specification of Letters Patent.  Patented Nov. 18, 1919.

Application filed December 30, 1918. Serial No. 268,823.

*To all whom it may concern:*

Be it known that I, GEORGE T. LUCAS, a citizen of the United States, and a resident of the city and county of San Francisco, State of California, have made a new and useful invention—to wit,—Improvement in Electric Soldering-Irons; and I do hereby declare the following to be a full, clear, concise, and exact description of the same.

The invention relates particularly to the soldering tip of soldering irons.

One object of the invention is to provide a molten solder reservoir in the soldering tip, adapted for the solder coating of cable ends and the like, by immersion in the reservoir.

Other objects and advantages will appear as this description progresses.

In this specification and the annexed drawings, the invention is illustrated in the form considered to be the best, but it is to be understood that the invention is not limited to such form, because it may be embodied in other forms, and it is also to be understood that in and by the claims following the description, it is desired to cover the invention in whatsoever form it may be embodied.

The term soldering "iron" will hereinafter be used for identification, it being understood, however, that reference is made to soldering copper, the conventional form of which is a tip consisting of a solid portion of copper, or other suitable metal having an affinity for solder, with a suitably formed point and mounted upon a suitable heat non-conducting handle. Such soldering irons are used by being first heated, then applied to the metal to be soldered until the same becomes heated by convection so that the solder applied may be caused to flow in the presence of a suitable flux for spreading the solder as desired. Such soldering irons are effective for superficial work and can be used for coating or "tinning" the ends of electric wires or cables by laying the same in contact with the soldering iron until they are sufficiently heated by convection to cause the solder to flow about the strands of the cable end. This method is very wasteful of solder and time and does not result in a satisfactory finish to the cable end. It is the particular object of this invention to provide a soldering iron accessory particularly adapted to the soldering of such cable ends.

Because it is the latest practice in this art, applicant prefers to disclose his invention in connection with electric soldering irons, but he does not wish to be understood as limiting this invention to that particular type as the same result may be obtained with any means for heating the soldering tips.

In the accompanying one sheet of drawings,

Figure 1 is a side elevation partially in cross section of a soldering iron having an electrically heated soldering tip therein in accordance with this invention.

Fig. 2 is an end elevation of the same illustrating a modification.

Fig. 3 is a further suggested modification in side elevation and partially in cross section.

In detail, the construction illustrated in the drawings includes, referring to Fig. 1, the soldering tip 1, preferably of copper, extending into the electrical heating element 2 assembled on a suitable handle 3, and heated by electric current passing through the cable 4 to the heating element 6 surrounding the tip 1. The tip 1 is bent at an angle upward in the form of a hollow extension 7, forming a reservoir adapted to contain molten solder 8, heated by convection through the tip 1 surrounded by the heating element 6. For maintaining the reservoir 7 in a proper upright position, the tip 1 is provided with extension legs 9—9, that in conjunction with the handle 3 form a three legged support for the apparatus.

The modifications shown in Fig. 3 illustrate an old style soldering iron 11 having a reservoir 12 formed transversely therein.

This type of soldering iron has demonstrated its practicability and great utility as an accessory in electrical wiring, particularly on board ship, and more particularly on board submarines, wherein space is very limited and the armoring and sealing of the electric wiring is very important and compactness a prime consideration. Such surroundings do not permit the direct application of flame to the cable ends, nor permit sufficient latitude of movement for the purpose of coating these ends by the old method of heating them by the application of the soldering iron, and applying the solder thereto, particularly in overhead work in limited spaces.

In Fig. 1 is shown a cable end 13 illustrating one form of practice in connection with submarine wiring in which these cables carrying one or more leads such as 14—15, are assembled within a single armor in the form of a metal tube or in the form of interlaced wires as illustrated. This armor is stripped back exposing the leads 14 and 15 which are stripped of their insulation exposing the bare cable strands 16. These strands are usually tinned in their fabrication which gives them an affinity for solder, a considerable portion of which is tin. These exposed strands 16 are thoroughly cleaned, coated with a suitable flux, then dipped into the molten solder in the reservoir 7, as illustrated in Fig. 1. This immersion causes the solder to flow among the strands filling the interstices between the strand and forming the end 16 into a firmly welded terminal, insuring good electrical contact between all the strands and the connecting fixture into which they are inserted and set.

For overhead work, or work in inaccessible corners, the tip 1 need not be bent at right angles as illustrated in Fig. 1, but extends straight out in which case the iron would be held in a vertical position in operation.

Provision is made by means of the clamp 17 for the easy removal or insertion of the tips of various shapes, thus extending the scope of operation of a single heating element.

Having thus described my invention, what I claim as new and desire to secure by Letters Patent of the United States is as follows:

1. An electrical soldering iron having an annular heating element therein and a bent tip with a solder reservoir formed therein removably secured within said annular heating element.

2. An electrical soldering iron having an annular heating element therein; a bent tip with a solder reservoir formed therein removably secured within said annular heating element; and means integral with said tip for supporting the same.

3. A soldering iron having a removable tip; means integral therewith for supporting said tip; means for retaining said tip within said iron; a reservoir in said tip adjacent said supporting means and an electrical element within said iron for heating said tip.

4. A soldering iron having a removable bent tip, legs integral with said tip and diverging to form a suitable support for said tip, means for retaining said tip partially within said soldering iron, and a reservoir in said tip at a point above said legs.

In testimony whereof I have hereunto set my hand at San Francisco, Cal., this 3rd day of December, 1918.

GEORGE T. LUCAS.

In presence of—
BALDWIN VALE,
LINCOLN V. JOHNSON.